United States Patent [19]

Habib

[11] 4,370,834
[45] Feb. 1, 1983

[54] MACHINES FOR GRINDING TOOTHED CUTTING TOOLS

[76] Inventor: Robert Habib, 36,quai Gustave Ador, 1207 Geneva, Switzerland

[21] Appl. No.: 205,910

[22] Filed: Nov. 12, 1980

[30] Foreign Application Priority Data

Nov. 16, 1979 [CH] Switzerland ............ 10249/79

[51] Int. Cl.³ .................................................. B24B 49/00
[52] U.S. Cl. .......................... 51/165.72; 51/216 ND; 51/225; 33/185 R; 73/600
[58] Field of Search ............ 356/150, 399; 33/185 R, 33/1 PT, 202; 73/600; 51/216 ND, 225, 238 TR, 165.72

[56] References Cited

U.S. PATENT DOCUMENTS

| | | | |
|---|---|---|---|
| 2,005,130 | 6/1935 | Dalton | 51/165.72 |
| 2,840,958 | 7/1958 | Waller | 51/225 |
| 2,874,517 | 2/1959 | Markle | 51/225 |
| 2,971,372 | 2/1961 | Lewis | 73/600 |
| 3,646,593 | 2/1972 | Schubert | 51/216 ND |
| 3,835,591 | 9/1974 | Cimprich | 51/165.72 |

*Primary Examiner*—Harold D. Whitehead
*Attorney, Agent, or Firm*—Robert E. Burns; Emmanuel J. Lobato; Bruce L. Adams

[57] ABSTRACT

A machine for grinding toothed cutting tools comprises an emitter capable of emitting a light or an ultrasound ray and an optoelectronic or an ultrasound receiver respectively. The receiver is associated with a circuit for controlling the movement of a table of the machine on which a tool to be ground is supported. The positioning of the table is effected by the interception of the light or sound ray by the teeth of the tool, which causes the receiver to act to stop movement of the table.

8 Claims, 7 Drawing Figures

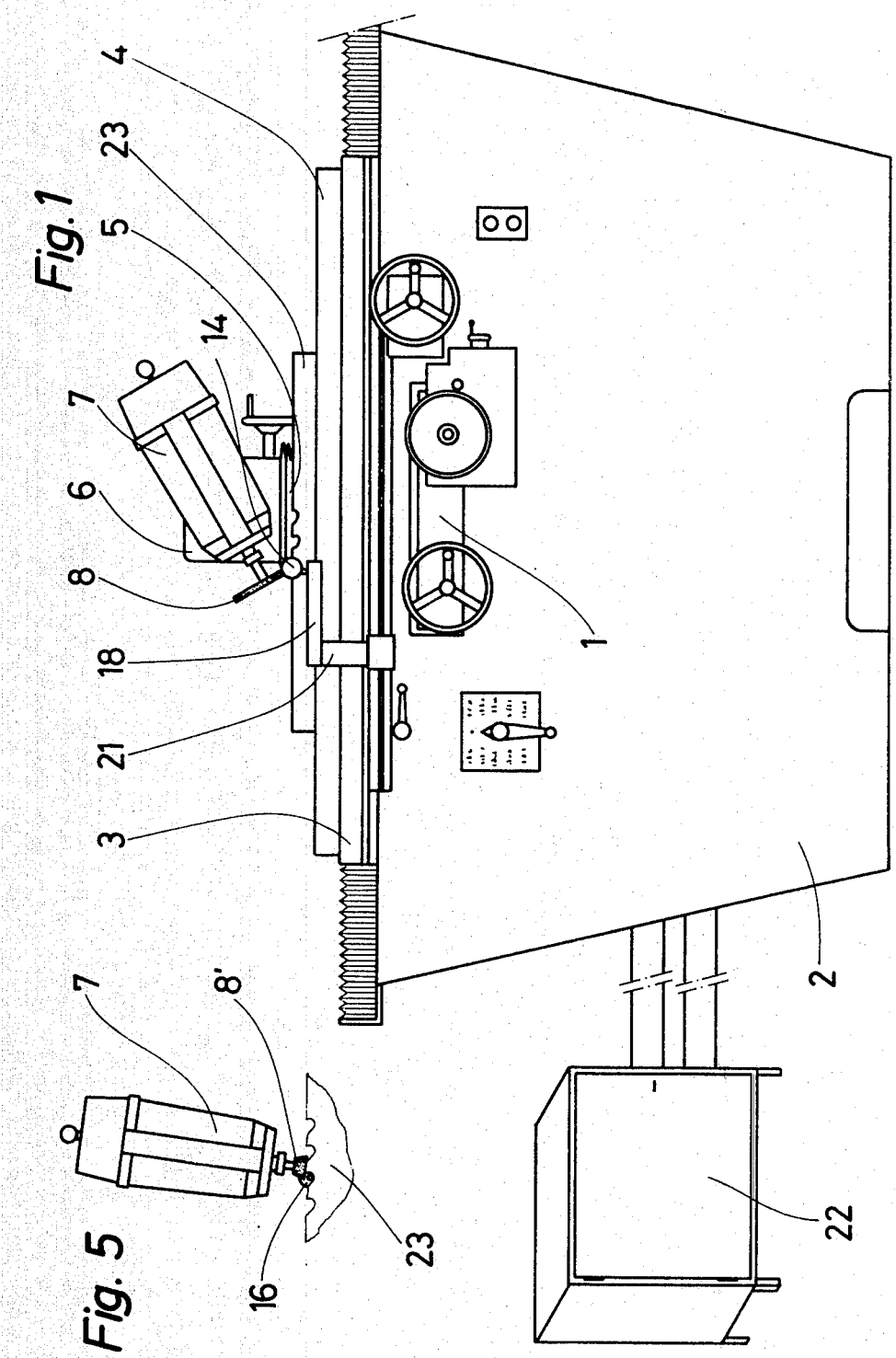

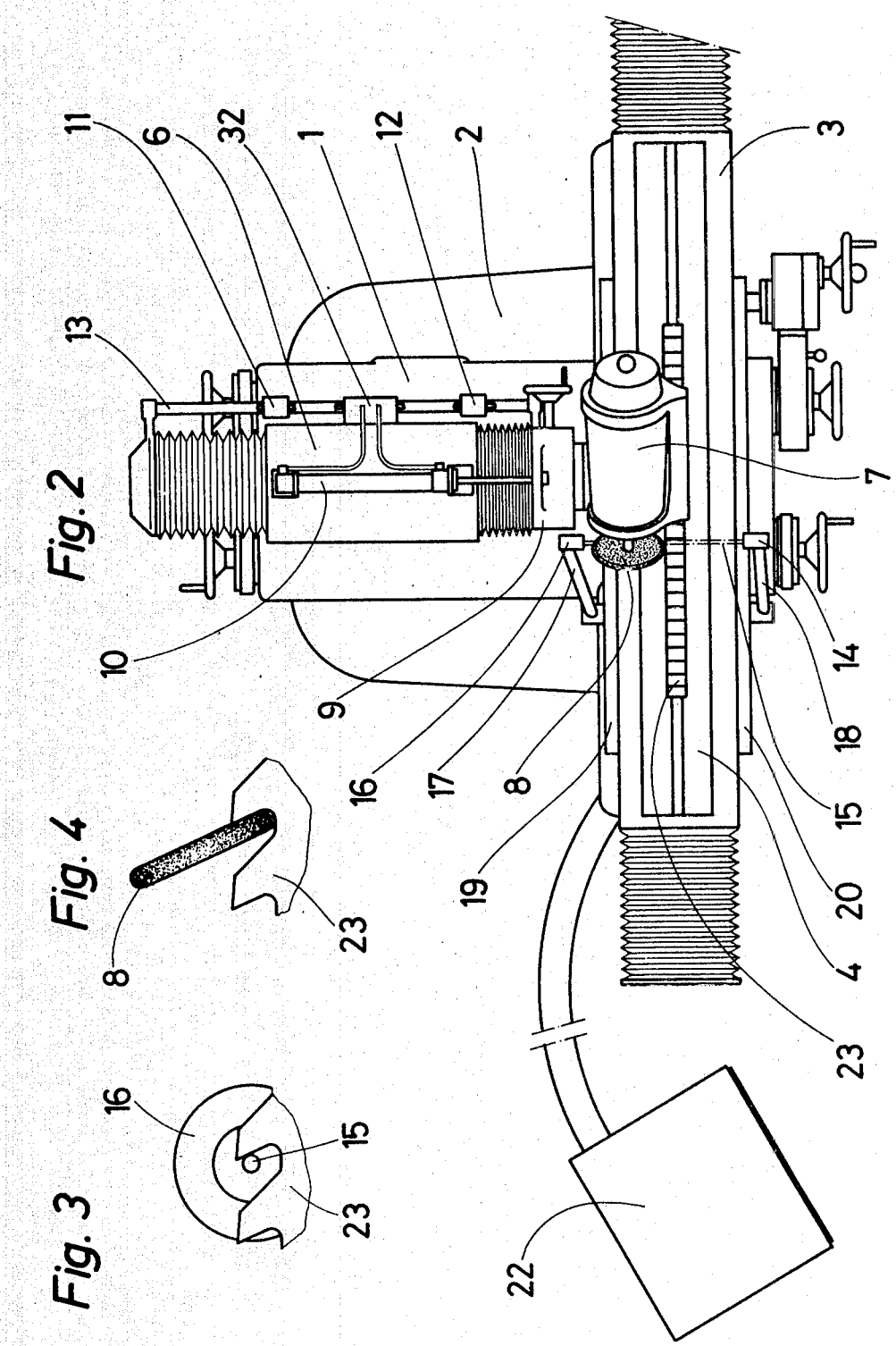

MACHINES FOR GRINDING TOOTHED CUTTING TOOLS

BACKGROUND OF THE INVENTION

The present invention relates to a machine for grinding toothed cutting tools such as spindles, saws, milling-cutters.

Conventional machines comprise a sliding table and a grinding wheel support head which is movable transversely with respect to the table and tiltable, and means for locating and positioning the table supporting the tool to be ground, relative to the grinding wheel. On machines of this type, it has already been proposed to position the table and thereby each tooth to be ground of the spindle fixed to the table, automatically by means of a follower member which comes into contact with the inner or upper side of the tooth to be ground in order to position this tooth correctly with respect to the grinding wheel. However, it is not always easy to position this follower member between the teeth of the spindle. Its movement requires a relatively expensive precision mechanism. Furthermore, it is not always possible to use the same follower member, since its shape must sometimes be modified according to the shape of the teeth of the tool to be ground. The precision obtained depends on the precision of the mechanical parts supporting the follower and on the precision of the response system for positioning the table, which this follower controls.

SUMMARY OF THE INVENTION

The object of the present invention is to replace this follower member by a simpler device, which is more accurate and can be used more universally for all shapes and dimensions of teeth.

According to the present invention there is provided a machine for grinding toothed cutting tools comprising a sliding table for supporting a tool to be ground, a grinding wheel support head which is movable transversely with respect to the table and which is tiltable, a grinding wheel supported by said support head, and means for locating and positioning the table relative to the grinding wheel, the positioning means comprising a light or sound emitter capable of emitting a ray of light or sound energy and an optoelectronic or any ultra-sound receiver respectively, which receiver is associated with a circuit for controlling the movement of the table, and the emitter and the receiver being mounted so that the light or sound ray can be intercepted by a tooth of the cutting tool to be ground.

These positioning means may also be used for the angular positioning of a milling-cutter or other toothed tool mounted on a tool-support.

The emitter and receiver may be mounted either on the machine frame or on the grinding wheel support head.

The use of a light ray or of an ultrasound wave also has a very important advantage: whereas the follower member has to be withdrawn in order to make space for the grinding wheel, this is not the case as regards the light ray or ultrasound wave, which one can in this case consider as being intangible. Thus, in the case where the emitter and the receiver are mounted on the frame, it is sufficient that it is placed at an adequate distance to allow the reciprocating movement of the grinding wheel on the work piece to be ground.

The light ray may be a conventional ray of light or a coherent ray of light emitted by a laser, if one wishes to obtain very great precision.

BRIEF DESCRIPTION OF THE DRAWINGS

The present invention will now be described, by way of example, with reference to the accompanying drawings in which:

FIG. 1 is a general elevational view of the machine;
FIG. 2 is a plan view thereof;
FIG. 3 shows a detail of the positioning of a tooth of cutting tool to be ground by means of a light ray;
FIG. 4 shows the grinding of the cutting angle of the tooth of the tool to be ground;
FIG. 5 shows the grinding of the relief of the tooth of the tool to be ground.

DETAILED DESCRIPTION OF THE DRAWINGS

Figure 6:
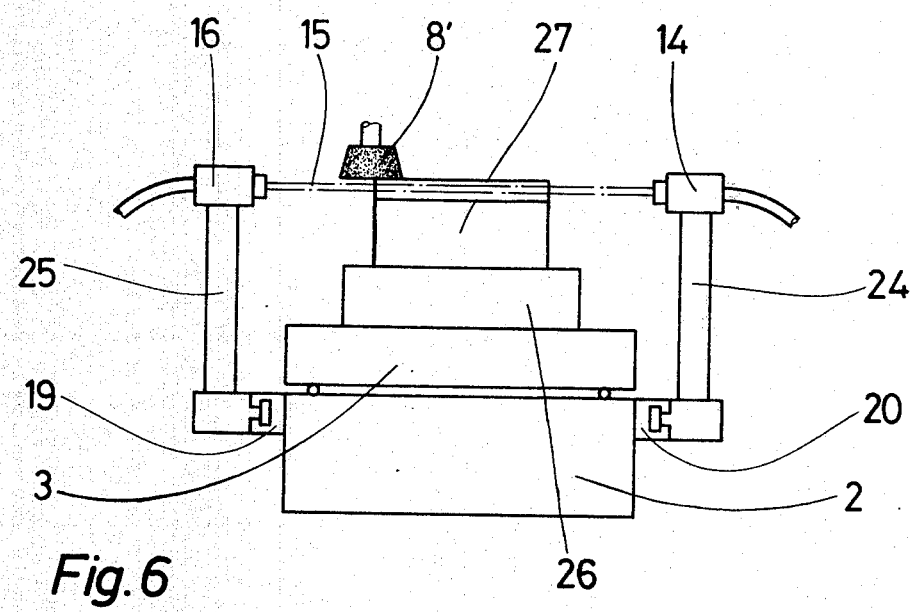
FIG. 6 shows diagrammatically in elevation and along the axis of a table of the machine, the mounting of an emitter and receiver on a frame of the machine.

The machine illustrated in the drawings is a grinding machine which is of conventional construction with the exception of the means for positioning a table thereof, which means form the object of the present invention. The machine comprises a transverse slide 1, passing through a frame 2 below a longitudinal slide 3 to which a table 4 is fixed. The transverse slide 1 supports a vertical pillar 5 to which is fixed a body 6 which supports a slide 9 to which a pivoting grinding wheel support head 7 is in turn fixed, the latter comprising a motor intended to drive a grinding wheel 8. The grinding wheel support head may thus carry out a reciprocating movement transversely with respect to the table 4. This reciprocating movement is controlled by a double-acting jack 10 controlled by two adjustable end of travel abutments 11 and 12 mounted on a lateral bar 13 arranged to move with the grinding wheel support head 7 and acting on the valve 32. The machine is also provided in known manner with steering wheels for manual driving of these different movable members. The body 6 is also able to move vertically with the pillar 5.

Mounted on the frame is an emitter 14 emitting a light ray 15 transversely with respect to the table, in the direction of an optoelectronic receiver 16. The receiver and emitter are mounted at the end of two arms 17 and 18 fixed in two guides 19 and 20, which can be adjusted simultaneously by means of micrometer screws, which guides are fixed to the frame 2 on each side of the longitudinal slide 3.

The source of light may be a source of white or monochromatic light or even the coherent light of a laser. The receiver 16 may be comprised of any photosensitive member such as photodiode, phototransistor or photoresistance for example. The receiver is connected to a control cabinet 22 comprising a circuit for controlling the movement of the table in accordance with the signal received by the receiver. This circuit is constructed according to conventional techniques.

In the example in question, one wishes to grind a flat spindle 23 provided with teeth on one side only, the latter being visible in FIG. 1 and the profile of which is shown in detail in FIGS. 3 and 4.

The machine operates in the following manner: after having secured the spindle 23 to the table 4, the position of the light ray 15 is adjusted with respect to the teeth of the spindle in order to obtain an interception of this ray, i.e. a stoppage of the table in a position such that as it passes between the teeth, the grinding wheel 8 removes the desired quantity of material. The automatic grinding operation may then begin. The operator starts up the machine by pressing a button on the control panel. The table moves until a tooth intercepts the light ray 15 (FIG. 3). This causes the stoppage of the table followed by the passage of the grinding wheel 8 (FIG. 4). The return of the grinding wheel support head to its initial position in turn initiates the advance of the table until the following tooth in turn interrupts the light ray, causing the stoppage of the table. It will be seen that this step-by-step movement may be obtained very simply by means of bistable circuits. The movements of the members are kept to the absolute minimum.

One proceeds in the same way for grinding the upper side (relief) of the teeth (FIG. 5), the grinding wheel support head naturally being equipped with a suitable grinding wheel 8'. In a spindle where the height of the teeth increases gradually from the left to the right in the drawing, in this case the optoelectronic receiver controls not only the forwards movement of the table, but also the gradual ascent of the grinding wheel support head by means of the pillar 5.

The embodiment illustrated in FIG. 6 virtually corresponds to the embodiment illustrated in FIGS. 1 and 2. The emitter 14 and receiver 16 are fixed by the intermediary of slides 19 and 20 to the frame 2, on each side of the longitudinal slide 3. The emitter and receiver are fixed to supports 24 and 25 which are able to move simultaneously in slides 19 and 20 by means of a micrometer screw which is not shown. The table is in this case constituted by a magnetic plate 26 to which a flat spindle 27 is fixed, which is intended to be ground. The source of light may be located in the emitter 14 or at any other point and connected by optic fibres to the emitter 14. The receiver 16 may also be comprised by the end of optic fibres provided with a possible optical system and connected to photosensitive elements located in the control circuit.

Figure 7:
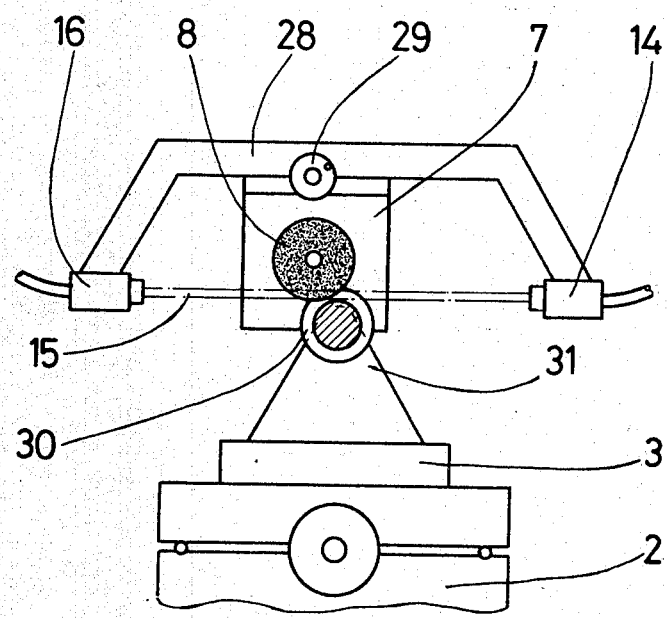
FIG. 7 shows diagrammatically in elevation and along the axis of the table, a variation in which the receiver and emitter are mounted on a grinding wheel support head of the machine.

In the embodiment illustrated in FIG. 7, the emitter 14 and receiver 16 are integral with the grinding wheel support head 7 through the intermediary of a support comprising two arms 28 mounted on the grinding wheel support head 7 by means of a slide parallel to the axis of the grinding wheel 8 and able to move by means of a micrometer screw 29. The tool to be ground is in this case a round spindle supported at one of its ends by a spindle-support rest 31 and at the other end by a headstock (not shown). This method of mounting the emitter and receiver has two considerable advantages: the first is to make it possible to take up in a simple manner the wear on the active side of the grinding wheel by moving the support 28 on the grinding wheel support head by means of the micrometer screw 29. The second advantage resides in the fact that the light ray 15 remains in the same plane, parallel to the side of the grinding wheel or coinciding with the plane containing this side, whatever the position of the grinding wheel support head about its horizontal axis, which signifies that the correct stoppage of the tooth will be independent of the height of the light ray, which is not the case in the first embodiment.

Numerous variations are possible without diverging from the scope of the invention. For example, according to a more sophisticated embodiment, it is possible to provide several light rays, for example emanating from the end of several optic fibres which are aligned horizontally and each cooperating with a receiver, so that the interception of the first light rays encountered by the tooth of the spindle causes progressive deceleration, the last ray intercepted causing a very precise stoppage.

The positioning device according to the invention may also be used for the angular positioning of certain milling cutters or other tools mounted on a headstock.

The light source may be replaced by an ultrasound emitter and the optoelectronic receiver by an ultrasound receiver. These devices are commercially available.

What is claimed is:

1. A machine for grinding toothed cutting tools comprising: a sliding table for supporting a tool to be ground, a grinding wheel support head which is movable transversely with respect to the table and which is tiltable, a grinding wheel supported by said support head, and means for locating and positioning the table relative to the grinding wheel, said positioning means comprising an emitter capable of emitting a ray of energy and a receiver for receiving the ray of energy and for developing an output signal for controlling the movement of the table, and the emitter and receiver being mounted so that the emitted ray can be intercepted by a tooth of the cutting tool to be ground to change the receiver output signal to indicate the position of the tool to be ground to enable control of the table position.

2. A machine as claimed in claim 1, in which the emitter is capable of emitting a light ray and the receiver in an optoelectronic receiver.

3. A machine as claimed in claim 1, in which the emitter is an ultrasound emitter and the receiver is an ultrasound receiver.

4. A machine as claimed in claim 1 in which the emitter and the receiver are attached to a frame of the machine.

5. A machine as claimed in claim 1, in which the emitter and the receiver are mounted on slides and their position can be adjusted by means of a micrometer screw.

6. A machine as claimed in claim 1, in which the emitter and the receiver are attached to the grinding wheel support head.

7. A machine as claimed in claim 6, in which the emitter and the receiver are mounted on a common support which is mounted on the grinding wheel support head through the intermediary of a slide movable by means of a micrometer screw arranged parallel to the axis of the grinding wheel.

8. A machine as claimed in claim 1, in which a tool-support headstock is provided and the receiver is also connected to an electrical circuit for controlling the angular position of the headstock.

* * * * *